(12) United States Patent
Akahane et al.

(10) Patent No.: US 7,995,629 B2
(45) Date of Patent: Aug. 9, 2011

(54) SOLID-STATE LASER APPARATUS

(75) Inventors: Yutaka Akahane, Kizukawa (JP); Akira Sugiyama, Kizukawa (JP); Koichi Yamakawa, Kizukawa (JP)

(73) Assignee: Japan Atomic Energy Agency, Ibaraki (JP)

( * ) Notice: Subject to any disclaimer, the term of this patent is extended or adjusted under 35 U.S.C. 154(b) by 0 days.

(21) Appl. No.: 12/379,757

(22) Filed: Feb. 27, 2009

(65) Prior Publication Data

US 2009/0274181 A1 Nov. 5, 2009

(30) Foreign Application Priority Data

May 2, 2008 (JP) ................................ 2008-120278

(51) Int. Cl.
*H01S 3/04* (2006.01)
(52) U.S. Cl. .......................................... 372/23; 372/34
(58) Field of Classification Search .................... 372/23, 372/34, 39
See application file for complete search history.

(56) References Cited

U.S. PATENT DOCUMENTS

| 5,095,487 A | * | 3/1992 | Meyerhofer et al. | ........... 372/23 |
| 5,854,802 A | * | 12/1998 | Jin et al. | ........... 372/22 |
| 2001/0010697 A1 | * | 8/2001 | Hammons et al. | ........... 372/20 |

OTHER PUBLICATIONS

Bensalah et al, Spectroscopic properties of Yb3+: LuLiF4 crystal grown by the Czochralski method for laser applications and evaluation of quenching processes: a comparison with Yb3+: YLiF4, 2004, Journla of Alloys and Compounds, 380, 15-26.*

* cited by examiner

*Primary Examiner* — Armando Rodriguez

(57) ABSTRACT

A high gain solid-state laser apparatus capable of generating short-pulse terahertz waves with high efficiency is provided. The apparatus includes laser gain media 1 and an optical switch 3 that entraps seed light from a laser oscillator into the apparatus and outputs amplified laser light pulses from the apparatus. In the apparatus, ytterbium-doped lutetium lithium tetrafluoride (LuLiF$_4$) crystal that is cooled below the liquid-nitrogen temperature is used as the laser gain media.

6 Claims, 4 Drawing Sheets

SOLID-STATE LASER APPARATUS

BACKGROUND OF THE INVENTION

1. Field of the Invention

The present invention relates to a high gain solid-state laser apparatus capable of producing short-pulse terahertz waves with high efficiency.

2. Technical Field of the Invention

In a solid-state laser apparatus, wavelengths available for laser amplification are determined according to the fluorescence spectral intensity of laser gain media used for the laser amplification in the apparatus. In general, when laser gain media has a broadband fluorescence spectrum (e.g. about 10 to 50 nm in a case of ytterbium-doped media), the amplified laser light has a broad bandwidth and uniform spectral intensity throughout the whole bandwidth. As to a broadband amplified laser light with a bandwidth in the order of several tens nanometer (nm: $10^{-9}$m), the duration of the amplified laser pulse can be compressed up to a femtosecond (fs: $10^{-15}$ second) region in view of the relationship of Fourier conjugation between the light pulse duration $\Delta\tau$ thereof and the bandwidth $\Delta v$ (i.e. $\Delta\tau \cdot \Delta v$=constant). Thus, the amplified broadband laser pulse has been applied in various fields such as non-thermal laser beam machining, femtosecond time-resolved measurement, research in physics under high intense laser field, and so on.

Recently, it has become possible to produce short-pulse terahertz (THz: $10^{12}$ hertz) light by a non-linear optical process (e.g. difference frequency mixing) using femtosecond laser. This technology has been receiving great attention in various fields such as real-time environmental measurement and hazardous material search (refer to "Future Prospect of Terahertz Technology", Masayoshi Tonouchi, The Review of Laser Engineering, Vol. 33, No. 12, December, 2005). To generate short-pulse terahertz waves, it is necessary to mix two short-pulse laser lights that have different wavelengths in a non-linear optical crystal.

As shown in FIGS. 5A to 5C, two short-pulse laser lights having different wavelengths are created by amplifying the broadband seed laser pulse (shown in FIG. 5A) in a laser amplifier (FIG. 5B), and cutting off the central part of the broadband spectral component of the amplified femtosecond laser light so that two parts in the spectral component of the laser pulses are extracted (FIG. 5C).

For extracting the two wavelength components, there are various methods such as a method in which a transmitted spectrum of laser light is limited by providing in a pulse compressor with a spectral mask that shields the central wavelength part of the amplified spectrum of the laser pulse (refer to, for example, A. Sugita et. al, Japanese Journal of Applied Physics Vol. 46, 226 (2007)), a method in which light is amplified while the central part of the amplified light is attenuated by means of a frequency-filtering element such as an etalon inserted in an amplifier (refer to, for example, K. Yamakawa et. al, Optics Letters Vol. 28, 2402 (2003)), and so on.

Due to insertion of frequency-dependent loss (see FIG. 5B), however, all the above mentioned methods have a problem that the gain in the apparatus as a solid-state laser apparatus is low and the production of the short-pulse terahertz waves with high efficiency cannot be expected.

SUMMARY OF THE INVENTION

The present invention has been developed in view of the above problems, and an object of the present invention is to provide a high gain solid-state laser apparatus capable of producing short-pulse terahertz waves with high efficiency.

To achieve the foregoing object, an aspect of the present invention provides a solid-state laser apparatus that is capable of performing simultaneous laser oscillation with respect to two or more wavelengths by using a laser gain media having broadband fluorescence spectrum and controlling the temperature of the laser gain media.

According to another aspect of the present invention, it is preferable to use ytterbium-doped lutetium lithium tetrafluoride (Yb:LuLiF$_4$) crystal as the laser gain media.

Yet another aspect of the present invention provides a solid-state laser apparatus simultaneously amplifying two or more spectral components in the broadband laser light emitted from the laser oscillator.

A further aspect of the present invention provides a solid-state laser apparatus that amplifies frequency-chirped laser light, the apparatus compressing the pulse duration of laser light using gain-narrowing during the laser amplification without a wavelength dispersive element.

According to the present invention, it is possible to provide a solid-state laser apparatus that is capable of generating short-pulse terahertz waves with high efficiency without light attenuation.

PREFERRED EMBODIMENT OF THE INVENTION (Solid-State Laser Apparatus)

Figure 1:
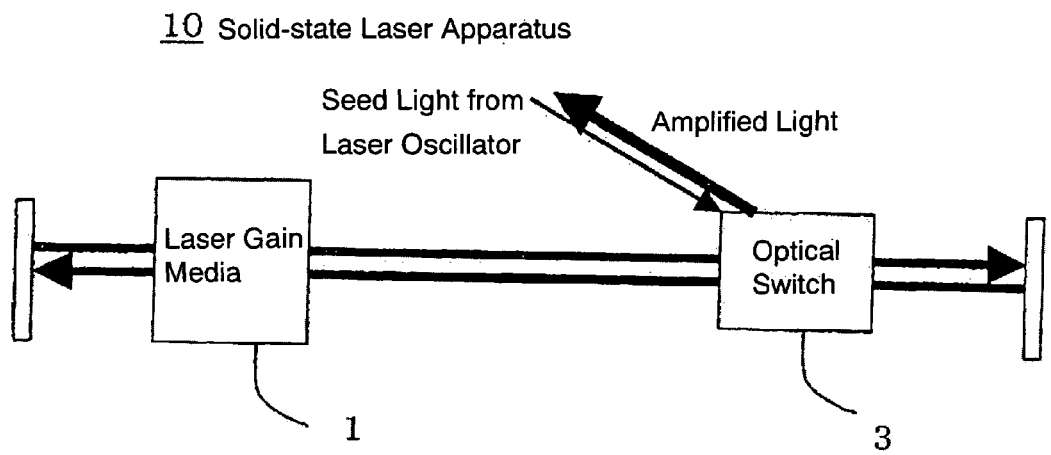
FIG. 1 is a schematic view showing a solid-state laser apparatus according to an embodiment of the present invention.

FIG. 1 is a schematic view of a solid-state laser apparatus according to an embodiment of the present invention.

A solid-state laser apparatus 10 includes a laser gain media 1 and an optical switch 3 that entraps seed light from a laser oscillator into the apparatus and outputs amplified laser light pulses from the apparatus. The solid-state laser apparatus 10 is used as a laser regenerative amplifier.

(Laser Gain Media 1)

Ytterbium(Yb)-doped laser gain media may be employed as laser gain media 1 applicable to the present invention. The Yb-doped laser gain media generally has a broadband fluorescence spectral bandwidth at room temperature. The Yb-doped laser gain media also has a feature that, when it is cryogenically cooled, intensities of several spectral components in the fluorescence spectrum becomes high.

The Yb-doped laser gain media can be ytterbium-doped yttrium lithium tetrafluoride (Yb:YLiF$_4$) crystal, ytterbium-doped glass media (Yb:Glass), ytterbium-doped calcium difluoride (Yb:CaF$_2$) crystal, or the like. It is preferable to use ytterbium-doped lutetium lithium tetrafluoride (Yb:LuLiF$_4$) crystal in view of high gain, the spectral intensity of fluorescence peak wavelengths, and so on.

(Laser Amplification Form)

A laser amplification form is preferably designed to be capable of adjusting the number of amplifications in laser media in the apparatus (that is, the number of times that the seed light passes through excited laser media) by means of an optical switch 3 in accordance with gain of amplification media, to make it possible to obtain high energy output with high efficiency. It is possible to arbitrarily adjust an amplification period (=(total optical distance of round-trips in an amplifier)/(light velocity)) of the seed light in a regenerative amplifier by adjusting the timing of the optical switch that can act at an arbitrary timing synchronized with seed light incidence in the regenerative amplifier. As the amplification period becomes longer, the number of times that the seed light passes through the laser gain media 1 in the amplifier increases.

(Laser Pulse Compression Form)

Figure 2:
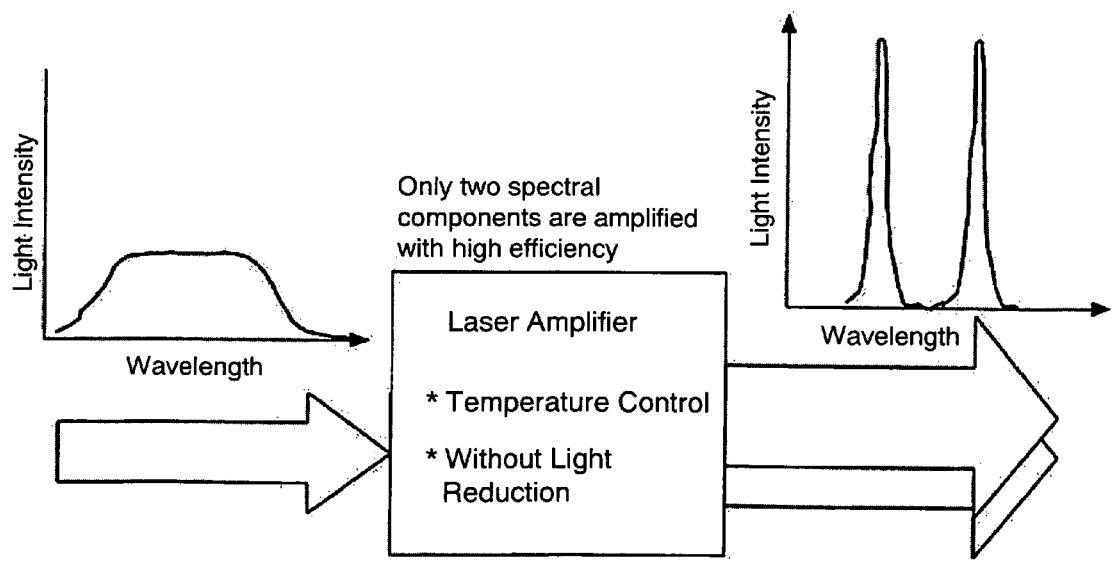
FIG. 2 is a schematic view showing an operation of the solid-state laser apparatus according to an embodiment of the present invention.
Figure 5:
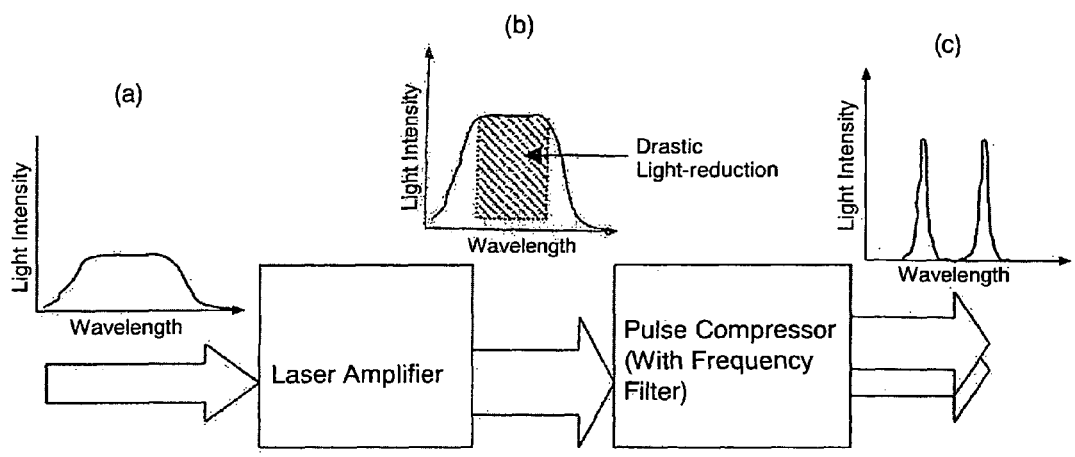
FIG. 5 is a schematic view showing a solid-state laser apparatus in a prior art.

When amplification is carried out with frequency-chirped seed laser pulse from a broadband laser oscillator, pulse compression is performed during the amplification by gain-narrowing during the regenerative amplification. In other words, if seed light from the laser oscillator with a broadband, frequency-chirped spectrum is amplified in laser gain media with a narrowband gain (i.e. with a narrowband fluorescence spectrum), only several parts of the broadband spectrum of the seed light is amplified. In view of the time axis, only several short time components (several tens ps: pico second=$10^{-12}$ second) in the seed light laser pulse of a long time duration (up to 1.2 ns: nano second=$10^{-9}$ second) is amplified to be a hundred-thousand times intensity as large as the original. As a result, the pulse duration of the laser light is effectively shortened during amplification. Thus, as shown in FIG. 2, a short pulse with high energy is directly obtained after the amplification without a pulse compressor (see FIG. 5) that uses lossy optical elements such as a diffraction grating pair. Therefore, it is possible to construct a laser apparatus with high efficiency.

Further, in the solid-state laser apparatus 10 shown in FIG. 1, it is possible to perform a Q-switch laser operation without injecting a seed laser pulse from an oscillator.

(Effect of the Present Embodiment)

In this embodiment, a laser crystal has a broadband fluorescence spectrum at ordinary temperature, but is characteristically changed to have large emission (fluorescence) cross-sections at two or more wavelengths in the broadband spectrum by cryogenic cooling. When the laser crystal is used as laser gain media in an amplifier, it becomes possible to generate two or more short-pulse laser lights having different wavelengths simultaneously without using a frequency filter.

The generated short-pulse laser lights are directly used for producing short-pulse terahertz waves without a spectral control that causes significant attenuation. Consequently, a compact terahertz wave apparatus with high efficiency can be developed.

(Other Embodiments of the Present Invention)

A solid-state laser apparatus according to the present invention may be embodied also as follows:

(1) A solid-state laser apparatus wherein two or more spectral components of a seed light laser pulse emitted from a laser oscillator are simultaneously amplified by using ytterbium-doped laser gain media that is thermally controlled.

(2) The solid-state laser apparatus according to (1), wherein the pulse duration of laser light is compressed using gain-narrowing during laser amplification of frequency—chirped output light emitted from the laser oscillator.

(3) The solid-state laser apparatus according to any one of (1) and (2), including: ytterbium-doped laser gain media that is thermally controlled; and an optical switch for inputting seed light from the laser oscillator into the apparatus and outputting the amplified laser light pulse from the apparatus.

(4) The solid-state laser apparatus according to any one of (1), (2) and (3), wherein ytterbium-doped lutetium lithium tetrafluoride ($LuLiF_4$) crystal is used as the ytterbium-doped laser gain media.

(5) A solid-state laser apparatus wherein laser oscillations with respect to two or more spectral components in the spectral bandwidth of equal to or greater than 10 nm and smaller than 50 nm are simultaneously achieved by using ytterbium-doped laser gain media that is thermally controlled.

(6) The solid-state laser apparatus according to (5), wherein ytterbium-doped lutetium lithium tetrafluoride ($LuLiF_4$) crystal that is cooled below the liquid-nitrogen temperature is used as the ytterbium-doped laser gain media.

EXAMPLE 1

Figure 3:
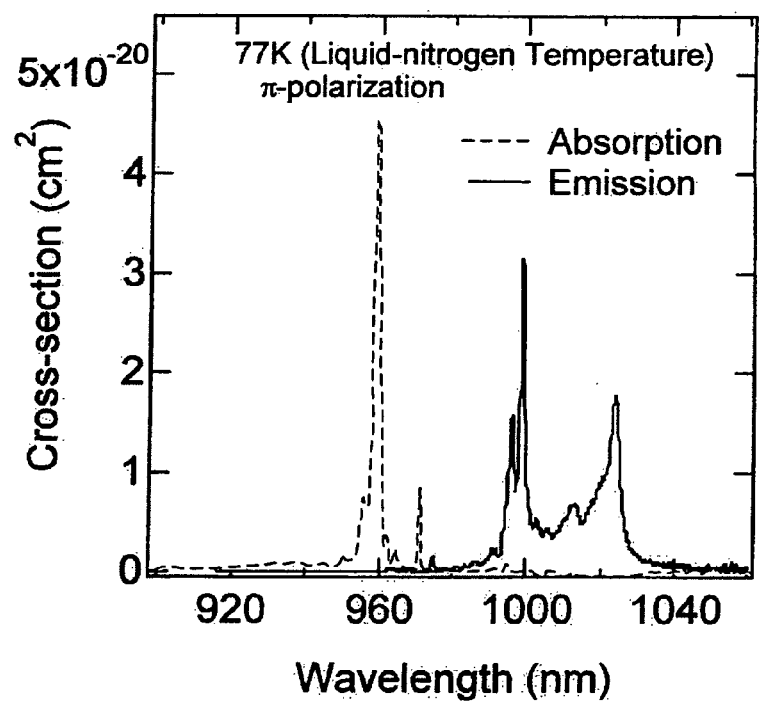
FIG. 3 is a graph showing absorption and emission (fluorescence) cross-sections of Yb:LuLiF$_4$ crystal in example 1.
Figure 4:
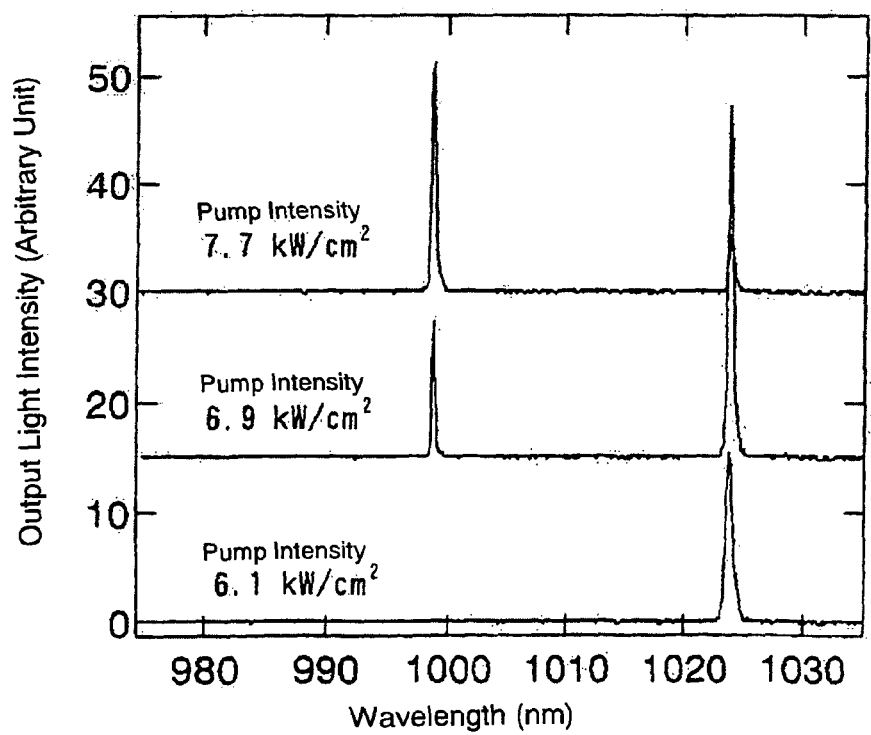
FIG. 4 is a graph showing spectra of amplified light when two spectral components are simultaneously amplified in example 3.

Ytterbium-20%-doped lutetium lithium tetrafluoride (Yb:$LuLiF_4$) crystal was cooled at the liquid-nitrogen temperature (77K). As shown in FIG. 3, it was found that the emission (fluorescence) cross-sections of the Yb:$LuLiF_4$ crystal at two wavelengths of 999 nm and 1024 nm increase 10 times and 4 times respectively with πpolarization at the liquid-nitrogen temperature. Thus, it was also found that the Yb:$LuLiF_4$ crystal is one of crystals that are preferable as the laser gain media 1 of the solid-state laser apparatus 10 shown in FIG. 1.

EXAMPLE 2

A laser pulse from a mode locked oscillator (central wavelength: 999 nm or 1024 nm (variable); bandwidth: 15 nm; pulse duration: 100 fs) was frequency-chirped up to 1.2 ns by means of an optical fiber. The frequency-chirped laser pulse was input as seed light into the solid-state laser apparatus 10 shown in FIG. 1, and was amplified with the π polarization direction by using ytterbium-20%-doped lutetium lithium tetrafluoride (Yb:$LuLiF_4$) crystal cooled at the liquid-nitrogen temperature (77K) as the laser gain media 1. In the first experiment in which a wavelength of the seed light was set to 999 nm, amplification at 999 nm wavelength was observed and the maximum output energy of 6 mJ was obtained. While the light was amplified, the duration of the amplified laser pulse was compressed by gain-narrowing in accordance with the gain characteristic of the amplification media, and the duration of the amplified laser pulse was measured to be 13.2 ps. When the central wavelength of the mode locked oscillator was set to 1024 nm and decrease the focused intensity of a laser diode (LD) for pumping an amplifier, the amplified light at 1024 nm wavelength was obtained, and the maximum energy and the pulse duration were measured to be 8.5 mJ and 27.4 ps, respectively.

EXAMPLE 3

In the solid-state laser apparatus 10 shown in FIG. 1, a Q-switch laser operation was experimentally carried out without injecting seed light from an oscillator.

When the pump intensity of the LD on the laser gain media 1 was set to be equal to or greater than 6.9 kW/cm$^2$, which is a nearly medium value in the foregoing second example, it was observed that two spectral components of 999 nm and 1024 nm were simultaneously amplified. In view of this fact, it is understood that two-color short pulses are simultaneously amplified when a frequency-chirped laser light from a laser oscillator that has a broad bandwidth including two wavelengths of 999 nm and 1024 nm is used as seed light. Further, when two-color intense laser pulses of 999 nm and 1024 nm wavelengths are overlapped in nonlinear crystal while adjusting the timings thereof, far-infrared light pulses (terahertz waves) are generated. The wavelength of the terahertz waves does not depend on the type of the crystal and so on, but has a value of the difference between the frequencies of the mixed light pulses in view of the energy conservation law (namely, 300.3 THz (999 nm)−293.0 THz (1024 nm)=7.3 THz (41096 nm)). Therefore, it is possible to generate short-pulse terahertz waves of 7.3 THz with high efficiency by applying difference frequency mixing to the laser lights of the two wavelengths in non-linear crystal.

What is claimed is:

1. A solid-state laser apparatus comprising a laser gain media having a broadband fluorescence spectrum, wherein the character of the laser gain media is changed by controlling the temperature of the laser gain media so that two or more spectral components have higher emission cross-sections than those of the remaining spectral components, and wherein the laser gain media emits laser lights simultaneously at two or more wavelengths in the broadband fluorescence spectrum by controlling the temperature of the laser gain media.

2. The solid-state laser apparatus according to claim 1, wherein the laser gain media is doped with ytterbium.

3. The solid-state laser apparatus according to claim 1, wherein said laser gain media is lutetium lithium tetrafluoride ($LuLiF_4$) crystal that is doped with ytterbium.

4. A solid-state laser apparatus comprising a laser gain media that amplifies broadband laser light emitted from a laser oscillator, wherein the laser gain media has a characteristic of simultaneously amplifying two or more spectral components in the broadband laser light emitted from the laser oscillator without using a mask or attenuator.

5. The solid-state laser apparatus according to claim 4, wherein the laser gain media has a characteristic that the pulse duration of the laser light is compressed through the process of gain-narrowing during the laser amplification without a frequency-dependent light-attenuation device when a frequency chirped laser light is used as the broadband laser light emitted from the laser oscillator.

6. A solid-state laser apparatus comprising a laser gain media having a broadband fluorescence spectrum, wherein the laser gain media emits laser lights simultaneously at two or more wavelengths in the broadband fluorescence spectrum by controlling the temperature of the laser gain media, wherein the character of the laser gain media is changed by cryogenic cooling so that said two or more spectral components have higher emission cross-sections than those of the remaining spectral components.

* * * * *

UNITED STATES PATENT AND TRADEMARK OFFICE
CERTIFICATE OF CORRECTION

| | | |
|---|---|---|
| PATENT NO. | : 7,995,629 B2 | |
| APPLICATION NO. | : 12/379757 | |
| DATED | : August 9, 2011 | |
| INVENTOR(S) | : Yutaka Akahane et al. | |

It is certified that error appears in the above-identified patent and that said Letters Patent is hereby corrected as shown below:

Title Pg, Item (56) (Other Publications), Line 4, delete "Journla" and insert -- Journal --, therefor.

Signed and Sealed this
Thirty-first Day of January, 2012

David J. Kappos
*Director of the United States Patent and Trademark Office*